(12) United States Patent
Kimura

(10) Patent No.: US 10,977,301 B2
(45) Date of Patent: Apr. 13, 2021

(54) SEARCH APPARATUS, SEARCH SYSTEM, AND NON-TRANSITORY COMPUTER READABLE MEDIUM

(71) Applicant: FUJI XEROX CO., LTD., Tokyo (JP)

(72) Inventor: Shunichi Kimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 299 days.

(21) Appl. No.: 15/893,847

(22) Filed: Feb. 12, 2018

(65) Prior Publication Data
US 2018/0267999 A1  Sep. 20, 2018

(30) Foreign Application Priority Data

Mar. 17, 2017 (JP) .............................. JP2017-052766

(51) Int. Cl.
*G06F 17/30* (2006.01)
*G06F 16/532* (2019.01)
(Continued)

(52) U.S. Cl.
CPC .......... *G06F 16/532* (2019.01); *G06F 3/1205* (2013.01); *G06F 3/126* (2013.01);
(Continued)

(58) Field of Classification Search
CPC ...... G06F 16/532; G06F 16/51; G06F 3/1205; G06F 3/126; G06F 3/1286; G06K 9/00852; G06K 9/03; G06K 9/62
See application file for complete search history.

(56) References Cited

U.S. PATENT DOCUMENTS 5,905,811 A    5/1999  Shiiyama et al.
8,533,206 B1 *  9/2013  Guha ................... G06F 16/9535
                                                707/754
(Continued)

FOREIGN PATENT DOCUMENTS

JP          8-7033 A       1/1996
JP     2006-163446 A       6/2006
(Continued)

OTHER PUBLICATIONS

Communication dated Dec. 22, 2020 from the Japanese Patent Office in Application No. 2017-052766.

*Primary Examiner* — Huawen A Peng
(74) *Attorney, Agent, or Firm* — Sughrue Mion, PLLC

(57) ABSTRACT

A search apparatus includes a character string acquisition unit that acquires a character string recognized by a character recognition device, a search unit that sends to an information source the character sting as a search key and retrieves search result information responsive to the search key out of information stored on the information source, a determining unit that determines whether an error factor including at least one of a cause for an erroneous search and an erroneous search result is present, and a job switching unit that requests a manual input job to be performed to input a search key that is to replace the character string if the determining unit has determined that the error factor is present, and requests a verification job to be performed on the search result information if the determining unit has determined that the error factor is not present.

13 Claims, 12 Drawing Sheets

(51) Int. Cl.

| | |
|---|---|
| *G06K 9/62* | (2006.01) |
| *G06F 3/12* | (2006.01) |
| *G06F 16/51* | (2019.01) |
| *G06K 9/00* | (2006.01) |
| *G06K 9/03* | (2006.01) |

(52) U.S. Cl.
CPC ............ *G06F 3/1286* (2013.01); *G06F 16/51* (2019.01); *G06K 9/00852* (2013.01); *G06K 9/03* (2013.01); *G06K 9/62* (2013.01); *G06K 2209/01* (2013.01)

(56) References Cited

U.S. PATENT DOCUMENTS

| | | | |
|---|---|---|---|
| 2009/0210414 A1* | 8/2009 | Shinjo | G06F 16/2246 |
| 2009/0240488 A1* | 9/2009 | White | G10L 15/22 |
| | | | 704/9 |
| 2011/0313757 A1* | 12/2011 | Hoover | G06F 40/205 |
| | | | 704/9 |
| 2012/0215533 A1* | 8/2012 | Aravamudan | G06K 9/723 |
| | | | 704/235 |
| 2015/0025909 A1* | 1/2015 | Hayter, II | G16H 30/20 |
| | | | 705/3 |
| 2016/0275945 A1* | 9/2016 | Elisha | G06F 16/632 |
| 2016/0357731 A1* | 12/2016 | Zorzin | G06F 40/232 |
| 2020/0105247 A1* | 4/2020 | Cherepanov | G10L 15/187 |

FOREIGN PATENT DOCUMENTS

| | | |
|---|---|---|
| JP | 2013-41388 A | 2/2013 |
| JP | 2014-059674 A | 4/2014 |
| JP | 2016-081445 A | 5/2016 |

* cited by examiner

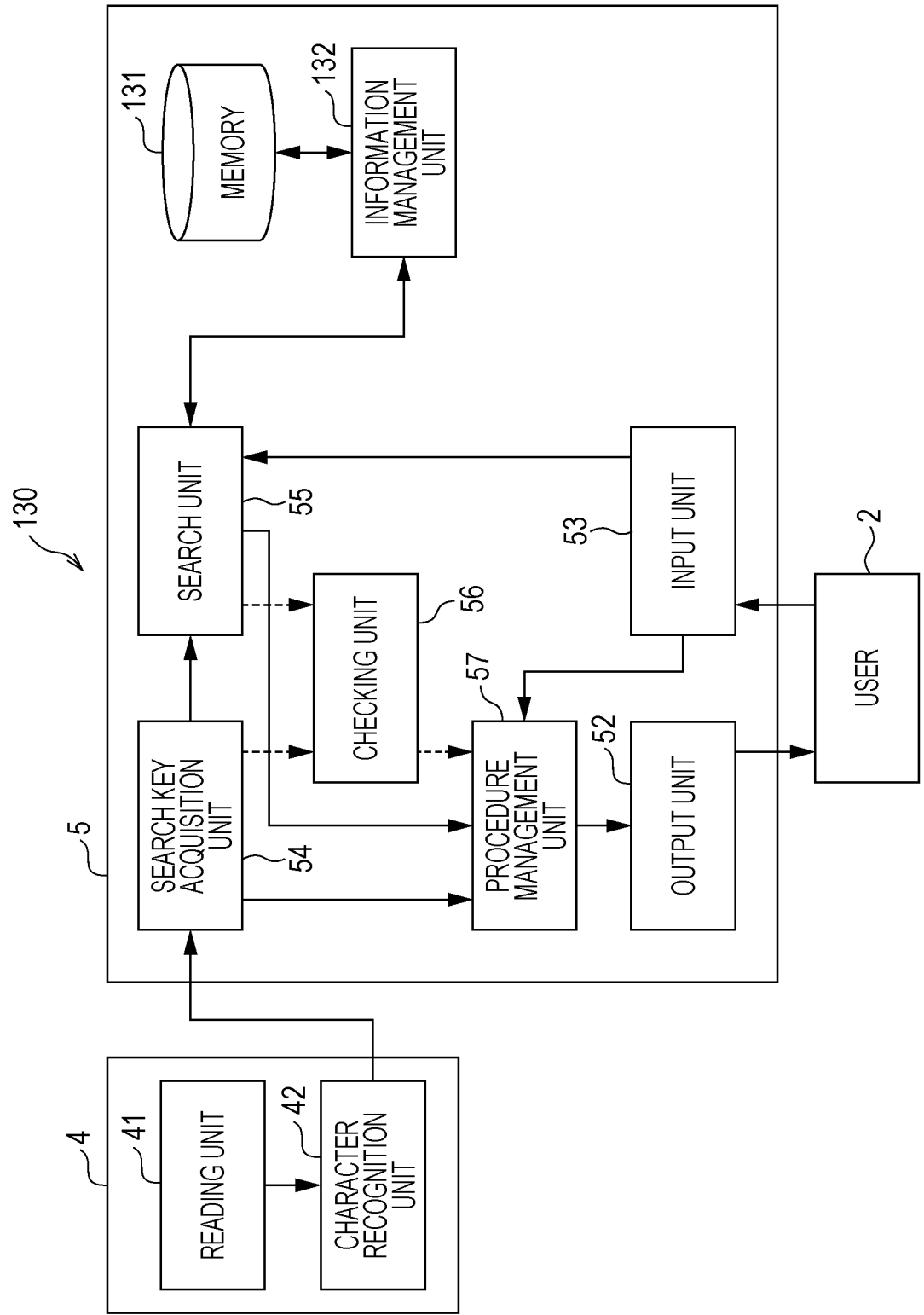

SEARCH APPARATUS, SEARCH SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-052766 filed Mar. 17, 2017.

BACKGROUND

(i) Technical Field

The present invention relates to a search apparatus, a search system, and a non-transitory computer readable medium.

(ii) Related Art

Search systems or search apparatuses that perform a search operation using a character string recognized through optical character recognition (OCR) have been disclosed.

When a search is performed using as a search key a character string recognized through OCR, search results are manually verified. If the search results are erroneous, a search key is manually input to perform a search operation again. However, if a search is performed using as a search key a character string that is obtained by recognizing handwritten letters through OCR, the possibility of performing a re-search is high compared to when a manual search is performed. If a person verifies search results of all searches, verification of the search results and re-search is time-consuming.

SUMMARY

According to an aspect of the invention, there is provided a search apparatus. The search apparatus includes a character string acquisition unit that acquires a character string recognized by a character recognition device, a search unit that sends to an information source the character sting as a search key and retrieves search result information responsive to the search key out of information stored on the information source, a determining unit that determines whether an error factor including at least one of a cause for an erroneous search and an erroneous search result is present, and a job switching unit that requests a manual input job to be performed to input a search key that is to replace the character string if the determining unit has determined that the error factor is present, and requests a verification job to be performed on the search result information if the determining unit has determined that the error factor is not present.

BRIEF DESCRIPTION OF THE DRAWINGS

Exemplary embodiments of the present invention will be described in detail based on the following figures, wherein:

FIG. 12 illustrates a configuration of another search system.

DETAILED DESCRIPTION

Exemplary embodiments of the present invention are described below with reference to the drawings.

Figure 1:
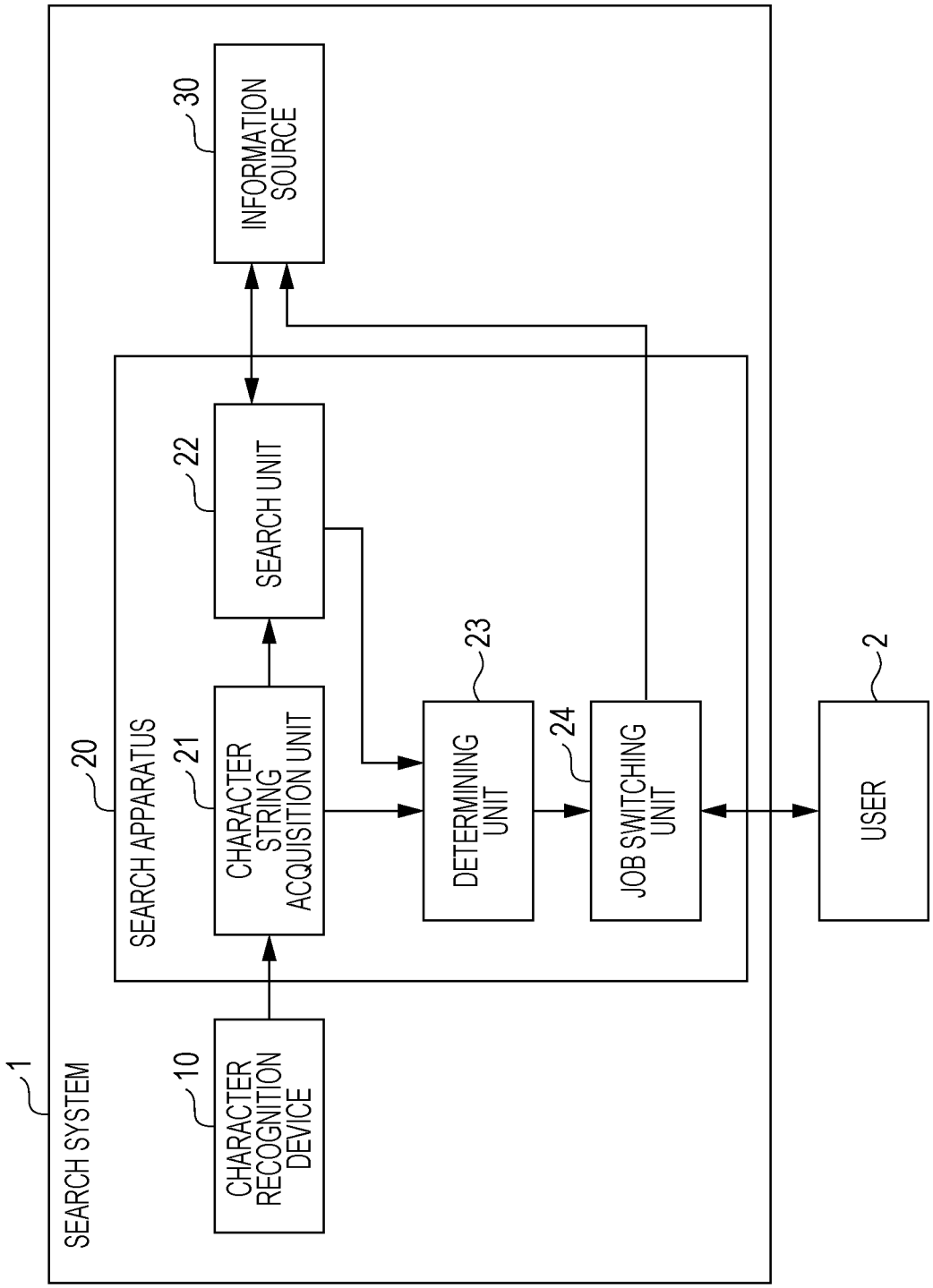
FIG. 1 illustrates a configuration of a first exemplary embodiment of the present invention.

FIG. 1 illustrates a configuration of a first exemplary embodiment of the present invention. FIG. 1 is a functional block diagram of the first exemplary embodiment.

A search system 1 of FIG. 1 is the first exemplary embodiment of the present invention, and includes a search apparatus 20 as a search apparatus of the first exemplary embodiment.

The search system 1 includes a character recognition device 10, and an information source 30. The character recognition device 10 performs a character recognition process on characters written in an image, using a technique such as optical character recognition (OCR), and outputs character string data that represents a recognized character string. The information source 30 works as a database. The information source 30 stores information. Upon receiving a search key, the information source 30 performs search in response to the search key, and outputs information hit in the search as search results. The character recognition device 10 is an example of a character recognition device in the exemplary embodiment of the present invention, and the information source 30 is an example of an information source in the exemplary embodiment of the present invention.

When the character recognition device 10 is communicably connected to the information source 30, the search apparatus 20 performs a search operation in the whole search system with the recognized character string serving as a search key. The search apparatus 20 is implemented when a search program of the first exemplary embodiment of the present invention is loaded onto an information processing apparatus, such as a computer, and executed there. The functional configuration of the search apparatus 20 illustrated in FIG. 1 corresponds to a program construction of the search program of the exemplary embodiment.

The search apparatus 20 includes a character string acquisition unit 21, a search unit 22, a determining unit 23, and a job switching unit 24. The character string acquisition unit 21 acquires a character string recognized by the character recognition device 10 in the form of character string data. The search unit 22 inputs to the information source 30 a search request including the character string acquired by the character string acquisition unit 21, while receiving information as search results from the information source 30. The character string acquisition unit 21 is an example of a character string acquisition unit in the exemplary embodiment of the present invention, and the search unit 22 is an example of a search unit in the exemplary embodiment of the present invention.

The determining unit 23 determines whether there is an error factor in a series of processes performed by the character recognition device 10, the character string acquisition unit 21, the search unit 22, and the information source 30. The error factor includes at least one of a cause for an erroneous search and an erroneous search result. The determining unit 23 is an example of a determining unit in the exemplary embodiment of the present invention.

The determining unit 23 determines a search error directly or indirectly. For example, the determining unit 23 determines that there is a search status leading to an error in the search process. The determining unit 23 also determines whether a search process error is present in at least one of the search key according to which a search request has been made and a search result of the search operation.

The job switching unit 24 switches between jobs in response to a determination result of the determining unit 23. For example, the job switching unit 24 selects a manual job requesting a user 2 to operate. If the determining unit 23 determines that there is an error factor in the search, the job switching unit 24 requests the user 2 to input a search key again by presenting an entry screen of the search key. If the determining unit 23 determines that there is no error factor, the job switching unit 24 requests the user 2 to perform a verification operation to verify that the search results from the information source 30 obtained through a search process are appropriate. The job switching unit 24 is an example of a job switching unit in the exemplary embodiment of the present invention.

If there is an error factor in the search, there is a high possibility that when the user 2 performs the verification operation on the search results, a searching error is detected and the search key is to be entered again. In other words, if there is an error factor, the verification operation is typically useless. If the job is selected as described above, the verification operation is omitted. The user 2 is thus free from a job of verifying whether the search results are appropriate in the search process or a job of shifting to a re-entry screen.

Exemplary embodiments of the present invention are more specifically described.

Figure 2:
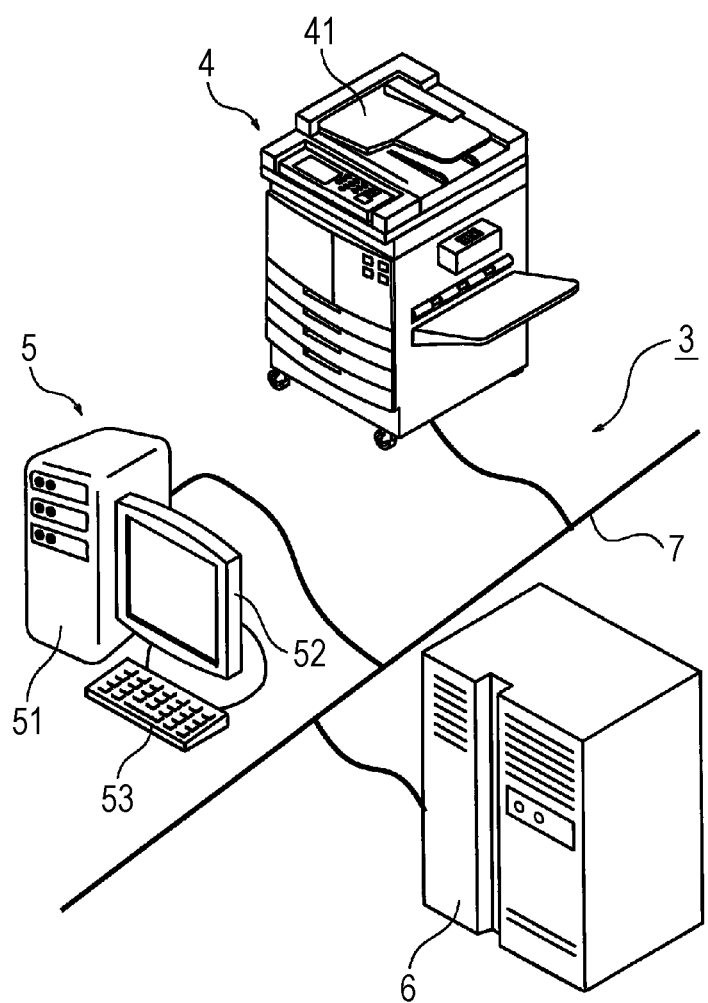
FIG. 2 is an external view of a second exemplary embodiment of the present invention.

FIG. 2 specifically illustrates a configuration of a second exemplary embodiment.

A search system 3 of FIG. 2 includes a multi-function apparatus 4, a personal computer 5, and a server 6, interconnected to each other via a local area network (LAN) 7.

The multi-function apparatus 4 includes a reading unit 41. The reading unit 41 reads a character string written on a paper sheet placed therein. The character string may be a printed character string or a hand-written character string.

The personal computer 5 includes a device body 51, a display 52, and an input unit 53. The device body 51 includes as hardware a microprocessor, such as a central processing unit (CPU), and a storage device, such as a random-access memory (RAM), a read-only memory (ROM), and/or a hard disk drive (HDD). A program is stored on the storage device, and the microprocessor, such as the CPU, reads the program from the storage device, and executes the read program. The display 52 includes a liquid-crystal display, and presents an operation screen to the user 2, under the control of the device body 51. The input unit 53 includes a keyboard and a mouse (not illustrated). The user 2 operates the input unit 53 to input a variety of information and a command to the device body 51.

The server 6 includes a large-scale storage device to store a vast amount of information. The server 6 includes a CPU. The server 6 executes a program loaded thereon, and thus works as a database.

Figure 3:
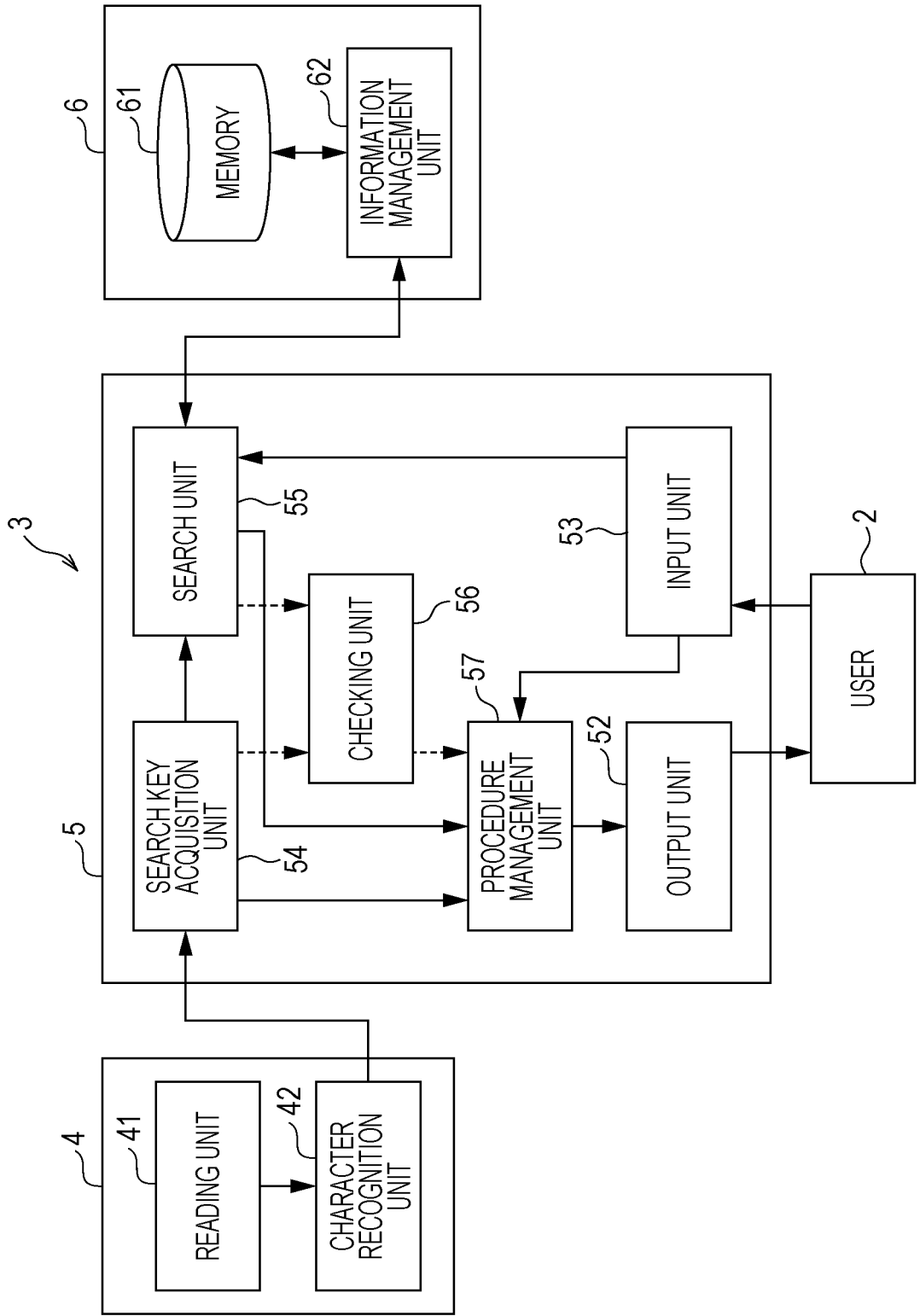
FIG. 3 illustrates a functional configuration of the second exemplary embodiment.

FIG. 3 illustrates a functional configuration of the second exemplary embodiment.

As described above, the search system 3 of the second exemplary embodiment includes the multi-function apparatus 4, the personal computer 5, and the server 6. The multi-function apparatus 4 includes the reading unit 41. The server 6 includes a large-scale memory 61.

The multi-function apparatus 4 includes a character recognition unit 42 that recognizes characters through character recognition from an image including characters read by the reading unit 41. The multi-function apparatus 4 is an example of a character recognition device in the second exemplary embodiment of the present invention.

The server 6 includes an information management unit 62 that stores information onto or retrieves information from the memory 61. The information management unit 62 is designed to have a search function of receiving the search key included in the received search request, and finding information responsive to the search key out of the information stored on the memory 61. The server 6 is an example of an information source of the second exemplary embodiment of the present invention.

The search program of the second exemplary embodiment of the present invention is loaded on the personal computer 5. By executing the search program of the second exemplary embodiment, the personal computer 5 functions as the search apparatus of the second exemplary embodiment of the present invention. The internal functional configuration of the personal computer 5 illustrated in FIG. 3 indicates a functional structure of the search program of the second exemplary embodiment.

The personal computer 5 functioning as the search apparatus of the second exemplary embodiment includes the display 52 and the input unit 53, and further includes, as the internal functions of the device body 51, a search key acquisition unit 54, a search unit 55, a checking unit 56, and a procedure management unit 57.

The search key acquisition unit 54 is an example of a character string acquisition unit of the exemplary embodiment of the present invention, and acquires the character string recognized by the character recognition unit 42 as a search key in a character string data format. The character string data of the search key is input to the search unit 55. In addition to the character string data, the search key acquisition unit 54 receives from the character recognition unit 42 a reliability value of recognition of each character included in the character string.

The search unit 55 is an example of a search unit of the exemplary embodiment of the present invention. The search unit 55 issues a search request by inputting to the server 6 a search request including character string data of a search key input from the search key acquisition unit 54. The server 6 receives the search request and inputs the received search request to the information management unit 62. The search unit 55 retrieves information output from the information management unit 62 as search results responsive to the search key.

The checking unit 56 is an example of the determining unit of the exemplary embodiment of the present invention. The checking unit 56 determines, according to specific determination criteria, whether at least one of an error in the search key acquired by the search key acquisition unit 54 and an error in the search results acquired by the search unit 55 is present.

The procedure management unit 57 is an example of a job switching unit of the exemplary embodiment of the present invention. The procedure management unit 57 requests the user 2 switches the operation screen from an operation screen to be operated by the user 2 to an operation screen responsive to the determination results obtained by the checking unit 56 and then requests the user 2 to operate on the operation screen responsive to the determination results. The operation screen is displayed on the display 52. The operation screen thus displayed may be a verification screen for the user 2 to verify information concerning the search results acquired by the search unit 55, or a key entry screen for the user 2 to enter a new search key in place of the search key acquired by the search key acquisition unit 54.

The user 2 having viewed the operation screen operates the input unit 53 to input to the personal computer 5 the character string data of a new search key, and command data representing a command from the user 2. The character string data is sent to the search unit 55 and the command data is sent to the procedure management unit 57.

When a new search key is input in response to the operation of the user 2, the search unit 55 inputs the character string data of the search key to the information management unit 62 in the server 6. The search unit 55 also acquires information output from the information management unit 62 as the search results responsive to the new search key.

If the user's command is a command to determine whether the search results are correct, the procedure management unit 57 causes the process to proceed to a next operation that uses the search results. The next operation may be an operation to store or update the search results or an operation to use, as a combination of correct data in another operation, a character string serving as a search key and information responsive to the search key on the database.

Specific operational procedures of the search system 3 thus constructed is described. In the discussion of the operational procedures, reference is made to the configuration of FIG. 3 as appropriate.

Figure 4:
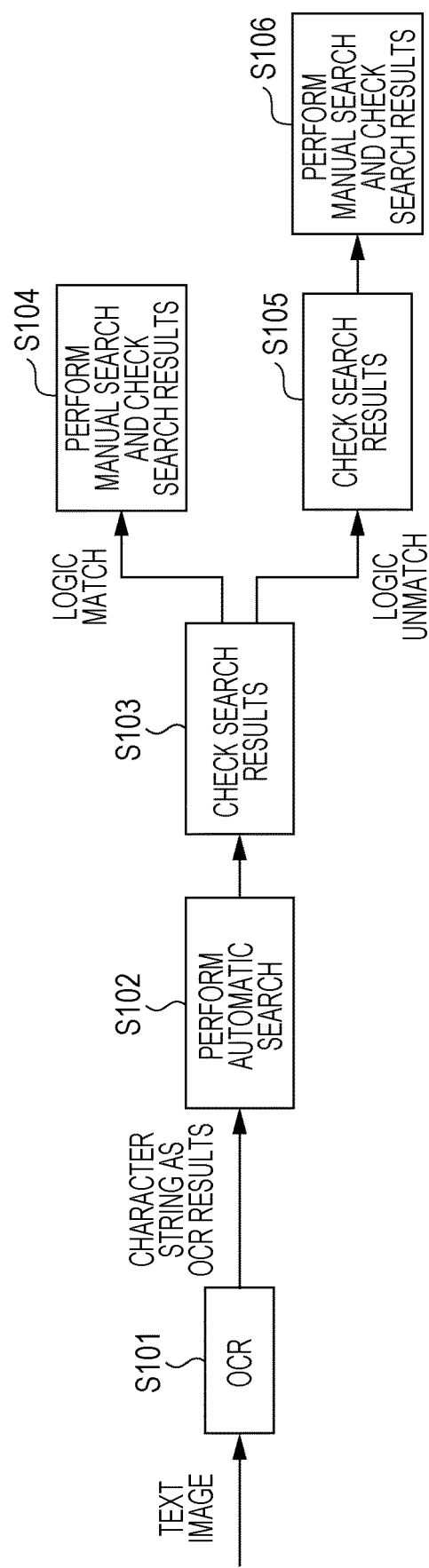
FIG. 4 illustrates a first operational procedure.

FIG. 4 illustrates a first operational procedure;

In the first operational procedure, the character recognition unit 42 in the multi-function apparatus 4 performs character recognition in step S101. The recognized character string is sent to the information management unit 62 in the server 6 via the search key acquisition unit 54 and the search unit 55. Search is thus performed without any human verification operation (step S102). A process that is performed in response to the search key without the human verification operation is referred to as an "automatic search". Through determination criteria, the checking unit 56 automatically checks the presence or absence of an error in the search results obtained through the automatic search (step S103).

More specifically, a check is made as to whether "the number of information items is 0". If the number of information items is 0, the checking unit 56 determines that the search is in error. The determination criteria are effective if the information stored on the server 6 is membership registration information, for example, if the character string serving as a search key is the name or membership number of a member. More specifically, if the search key is correct, there is a high possibility that the information of a registered member is searched and hit. The number of information items being 0 indicates that the search process is wrong or in error. For example, the character string as the search key may be in error or the data responsive to the search key is not present on the database. Automatic verification of the search results may easily detect such an obvious error.

If the search results obtained in the automatic search in step S103 satisfies the determination criteria that "the number of information items is 0", and the search results are determined to be in error, processing proceeds to step S104. The procedure management unit 57 switches the operation screen to the entry screen of the search key. A manual search is performed by the user 2. The search results of the manual search are also verified by the user 2. If it is determined that there is an obvious error in the search results, the verification screen for the results is not displayed. Since this omits a verification operation and a shift operation to the manual search, the user 2 is freed from these operations.

The results of the automatic search in step S103 indicating the determination criteria that "the number of information items is 0" mean an unmatch. If it is determined that at least one search result is obtained, processing proceeds to step S105. The procedure management unit 57 switches the operation screen to the verification screen on which the results of the automatic search are verified. If the user 2 views the verification screen and verifies that the search results are correct, processing proceeds to a next operation (not illustrated) in which the search results are used. As an example of the next operation, an applicant may now hand-write his or her name and address in an application form in a certificate issuing system in a public office. A user (an operator of the system) may read the applicant data by scanning the application form, searches a resident database in the public office using as a search key a character string read and recognized, and obtains search results. If the search results are correct, the user determines that the name and address of the applicant are correct. The user may issue a certificate to the applicant in a next operation. If the user 2 views the verification screen and then inputs an indication that the search is in error, the system proceeds to step S106. In a way similar to step S104, the manual search and the result check are performed by the user 2. The jobs of the user in steps S105 and S106 are not newly introduced jobs in the exemplary embodiment, but the jobs that are performed in an all-result check method (related art technique) in which the user 2 verifies all the search results. This is more time-saving to the user 2 because of the effect of branching to step S104 than in the all-result check method.

Figure 5:
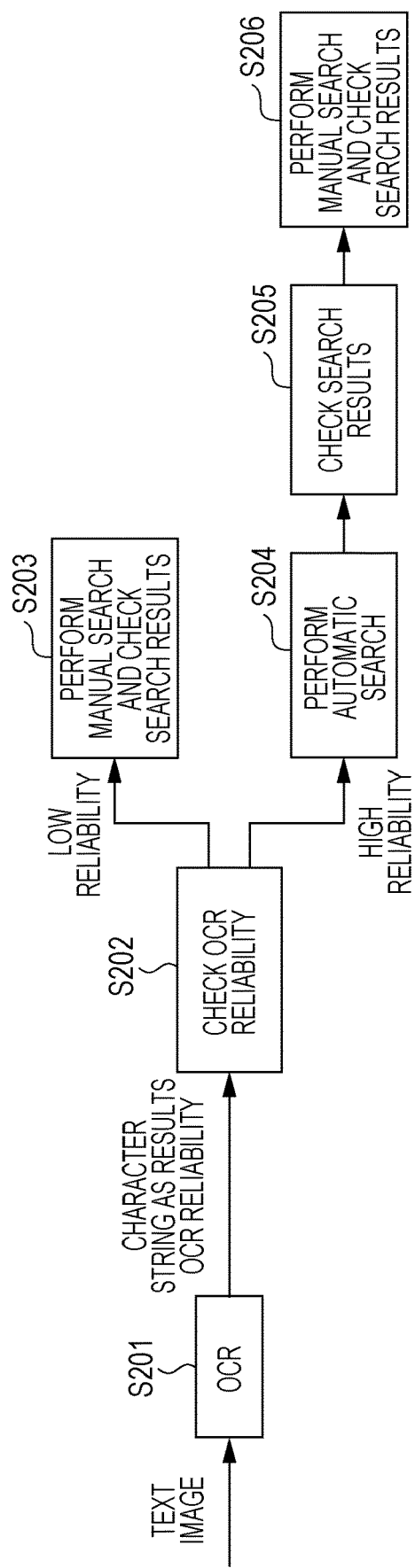
FIG. 5 illustrates a second operational procedure.

FIG. 5 illustrates a second operational procedure.

In the second operational procedure as well, the character recognition unit 42 in the multi-function apparatus 4 also performs character recognition in step S201. The search key acquisition unit 54 acquires the recognized character string and the reliability value of the character recognition.

The checking unit 56 determines the presence or absence of an error in the recognized character string by referencing the reliability value of the character recognition (step S202). More specifically, if the reliability value of the character recognition is lower than a predetermined threshold value, there is a higher possibility that the use of the search key in the search leads to erroneous search results. The checking unit 56 thus determines that an error factor is present.

An error determination example of the recognized character string performed by the checking unit 56 is based on the recognition reliability value of the character recognition process. The reliability in use for the error determination in the character string may include a variety of other factors. For example, concerning the error determination in the character strings recognized as names of persons and addresses, a name database (DB) and geographic area name DB may be prepared in advance. A character string that includes a person name or a geographic region name, not registered in the DBs, may be ranked low in reliability. In the error determination of the character string representing a recognized name, the recognized character string including numerals and/or symbols may also be ranked low in reliability. In the error determination of a character string, such as a postal code, typically with the fixed number of digits, a character string of seven-digit number, for example, may be ranked high in reliability and a character string other than a seven-digit number or including a character other than the numerals may be ranked low in reliability.

The threshold value used in the checking unit 56 may be one threshold value that is commonly used on all character strings. Alternatively, any particular one of plural threshold values may be used depending on the type of the character string. For example, different threshold values may be used on names and addresses. A different threshold value may be used depending on the location of any one character within the character string, or depending on the type of characters recognized.

If the checking unit 56 determines in step S202 that the character string obtained through character recognition is in error and not adequate as a search key, the automatic search is not performed. Processing proceeds to step S203. In a way similar to step S104 of FIG. 4, the procedure management unit 57 switches the operation screen to the search key entry screen. The user 2 performs the manual search. The user 2 also verifies the search results of the manual search.

If the reliability value of the character recognition is higher than a predetermined threshold value, the checking unit 56 determines that the character recognition is not in error. Processing proceeds to step S204. The character string of the search key is sent to the information management unit 62 in the server 6 via the search key acquisition unit 54 and the search unit 55. The automatic search is thus performed. In a way similar to steps S105 and S106 of FIG. 4, the user 2 verifies the results of the automatic search (step S205). If an error is included in the results, the user 2 performs the manual search and the result verification (step S206).

If erroneous character recognition causing a search error is detected in the second operational procedure, the automatic search is not performed. The process in the search apparatus and the search system is thus reduced. If erroneous character recognition is detected, the verification operation on the search results and the shift operation to the manual search are also omitted. The user 2 thus operates the search system in a time-saving fashion.

Figure 6:
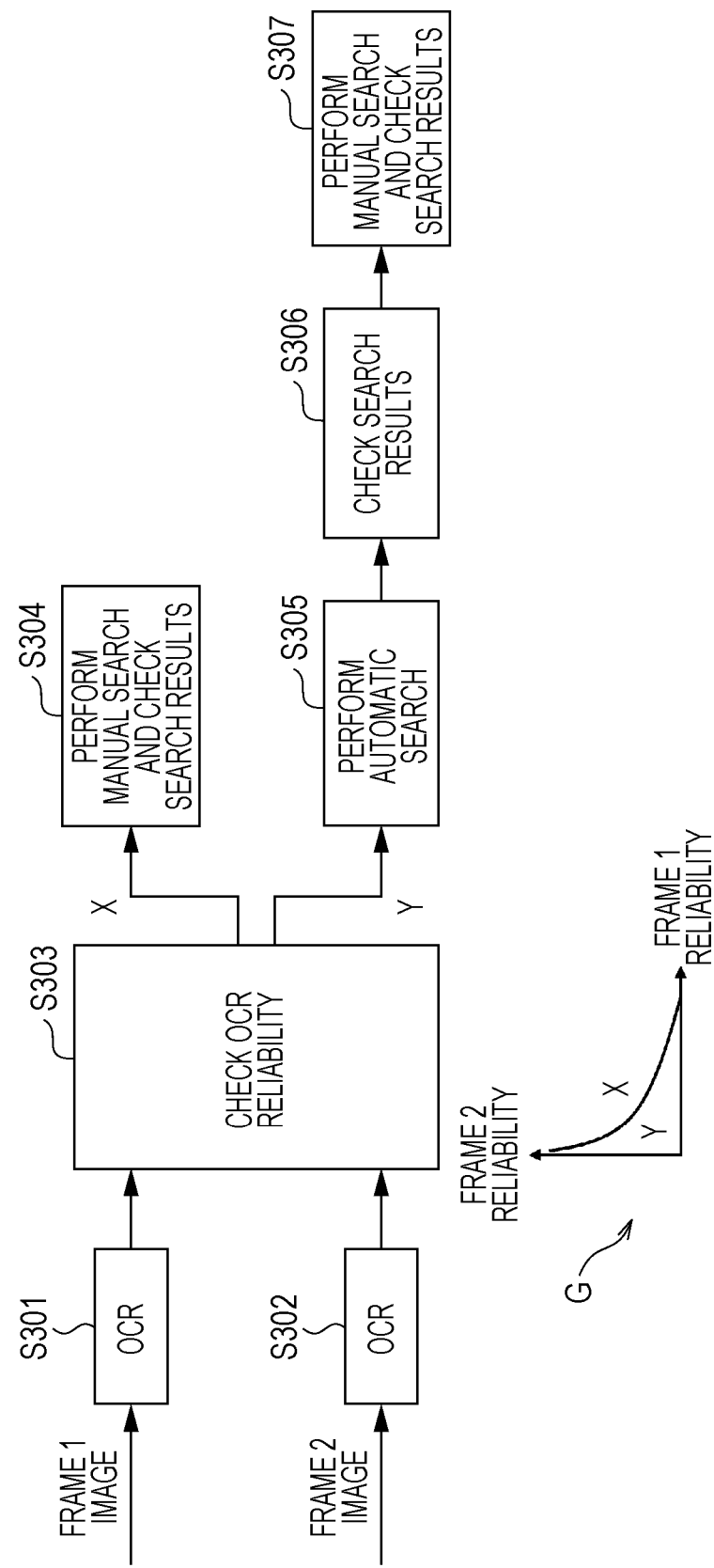
FIG. 6 illustrates a third operational procedure.

FIG. 6 illustrates a third operational procedure. In the third operational procedure, a combination of plural character strings (two character strings, for example) is used as a search key.

When the third operational procedure is started, the character recognition unit 42 in the multi-function apparatus 4 performs character recognition, thereby recognizing plural character strings described in plural entry columns (items) (steps S301 and S302). The search key acquisition unit 54 acquires the plural character strings and the reliability value of character recognition of each character string.

Based on a combination of recognition reliability values of the character strings, the checking unit 56 determines whether the search key is in error. As an example of the combination of recognition reliability values, a graph G is illustrated below step S203 in FIG. 6. In the graph G, the abscissa represents a recognition reliability value at first entry column and the ordinate represents a recognition reliability value at a second entry column. The origin at the bottom left corner of the graph G represents a maximum reliability point, and as the distance from the origin increases, the recognition reliability value decreases.

If each of the reliability values is lower in the graph G, the search key is determined to be in error (determined to be in a region X). If at least one of the reliability values is higher, the search key is determined to be free from error (determined to be in a region Y). For example, this determination may be useful in the case described below. For example, a search key that is obtained by OR-gating plural character strings is used in the search with one of the character strings being correct, and desired information is obtained as the search results. How to combine reliability values is based on an appropriate combination responsive to a combination of search keys in the search.

If the search key is determined to be in error (determined to be in the region X) in the determination based on the combination of the plural reliability values, the automatic search is not performed in a way similar to step S203 of FIG. 5, and the procedure management unit 57 switches the operation screen to the search key entry screen. The user 2 performs the manual search, and verifies the search results of the manual search (step S304).

If the search key is determined to be free from error (determined to be in the region Y) in the determination based on the combination of the plural reliability values, the automatic search (step S305) is performed, and the user 2 verifies the search results (step S306) in a way similar to steps S204 through S206 of FIG. 5. If the search results are in error, the user 2 performs the manual search and verifies the search results (step S307).

Figure 7:
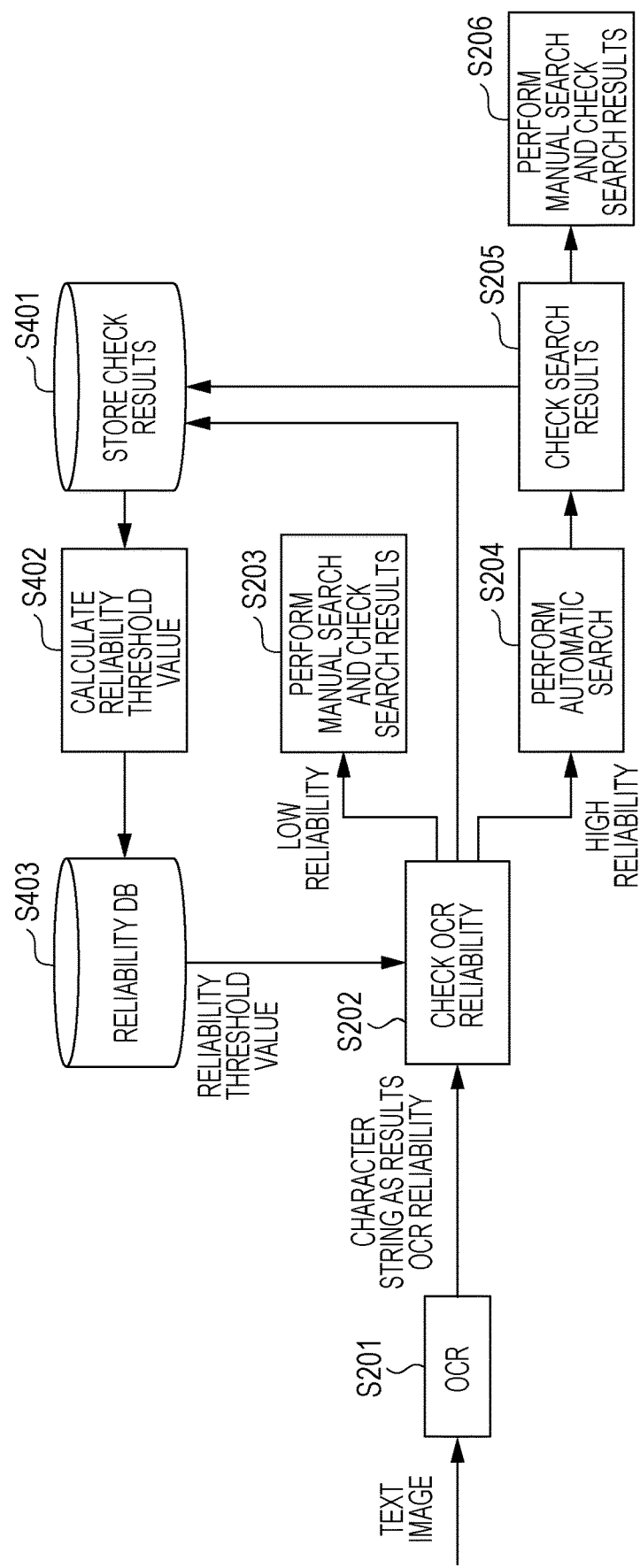
FIG. 7 illustrates a fourth operational procedure.

FIG. 7 illustrates a fourth operational procedure.

In the fourth operational procedure that is similar to the second operational procedure of FIG. 5, the character recognition is performed, the reliability value of the character recognition is checked, the search is performed, and the search results are verified (steps S201 through S206).

The reliability value of the character recognition does not directly indicate whether the character recognition is in error, but is a statistical value indicating that the lower the reliability value is, the higher the possibility of erroneous recognition is. If the threshold value of the recognition reliability value used in step S202 is too high, many of the character strings are subject to re-entry even if they are correct. This is more time-consuming from the user's point of view. If the threshold value of the recognition reliability value is too low, intended time-saving purposes are not achieved as desired, and a difference from the all-result check method in terms of consumed time becomes marginal.

The fourth operational procedure includes an automatic updating operation of the threshold value of the recognition reliability value used in step S202 in addition to steps S201 through S206 (the fourth operational procedure is applied if plural threshold values are used). More specifically, the reliability value used in the determination in step S202 and the results determined by the user in step S205 are stored in association with each other (step S401). The threshold value is calculated through a statistical process such that the time-saving performance for the user is maximized (step S402). The calculated threshold value is stored on the database for the threshold values of the reliability values (step S403). With the threshold values stored on the database, the threshold value used in the determination in step S202 is updated and used in determination later.

The automatic updating operation of the threshold value thus maximizes the time-saving performance for the user.

Figure 8:
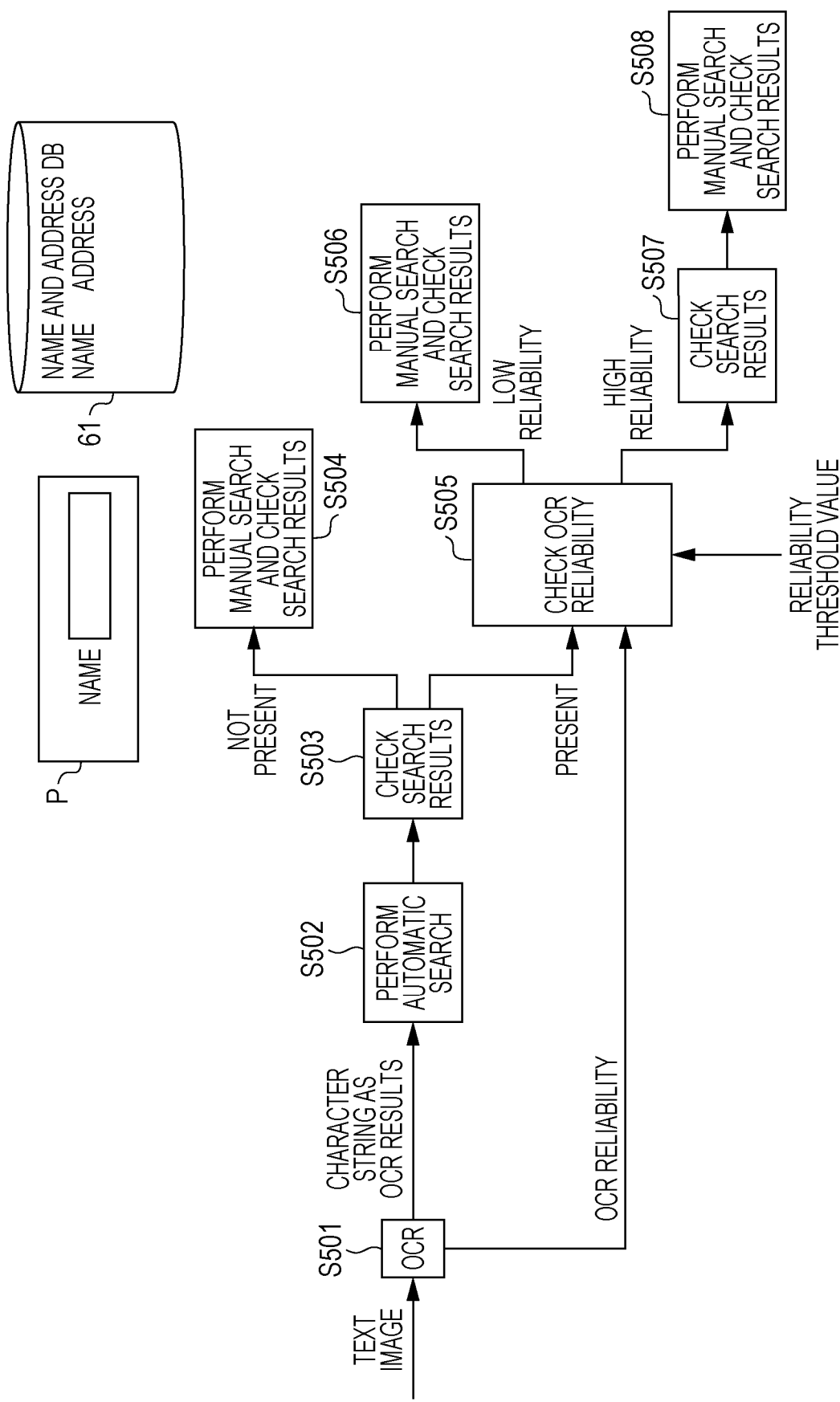
FIG. 8 illustrates a fifth operational procedure.

FIG. 8 illustrates a fifth operational procedure.

In the fifth operational procedure, the checking unit 56 checks the search results and the recognized character string. The fifth operational procedure is based on the assumption that a name is written on a paper sheet P read by the multi-function apparatus 4 and that the memory 61 stores a name and address database (DB) that associates names and addresses.

When the fifth operational procedure starts, the character recognition unit 42 in the multi-function apparatus 4 recognizes a name written on the paper sheet in step S501. The automatic search is performed with the recognized character string (name) serving as a search key (step S502). Using the determination criteria like "the number of information items is 0", the checking unit 56 checks the presence or absence of an error in the search results (step S503).

If the number of information items is 0, the checking unit 56 determines that the search results are in error, and processing proceeds to step S504. In a way similar to step S104 of FIG. 4, the user 2 performs the manual search and verifies the search results.

If information is present in step S502 in the automatic search, processing proceeds to step S505. The checking unit 56 checks the search key, based on the recognition reliability value of the character string. If the recognition reliability value of the character string is lower than the threshold value, the checking unit 56 determines that the search key is in error. Processing proceeds to step S506. The user 2 performs the manual search and verifies the search results.

If the recognition reliability value of the character string is higher than the threshold value, the checking unit 56 determines that the search key is not in error. Processing proceeds to step S507. The user 2 verifies the search results. If the user 2 determines that the search results are in error, the user 2 performs the manual search and verifies the search results (step S508).

The checking unit 56 performs a double-check operation in this way. An error in the search is more reliably determined and the user 2 operates the search system in a time-saving manner.

Figure 9:
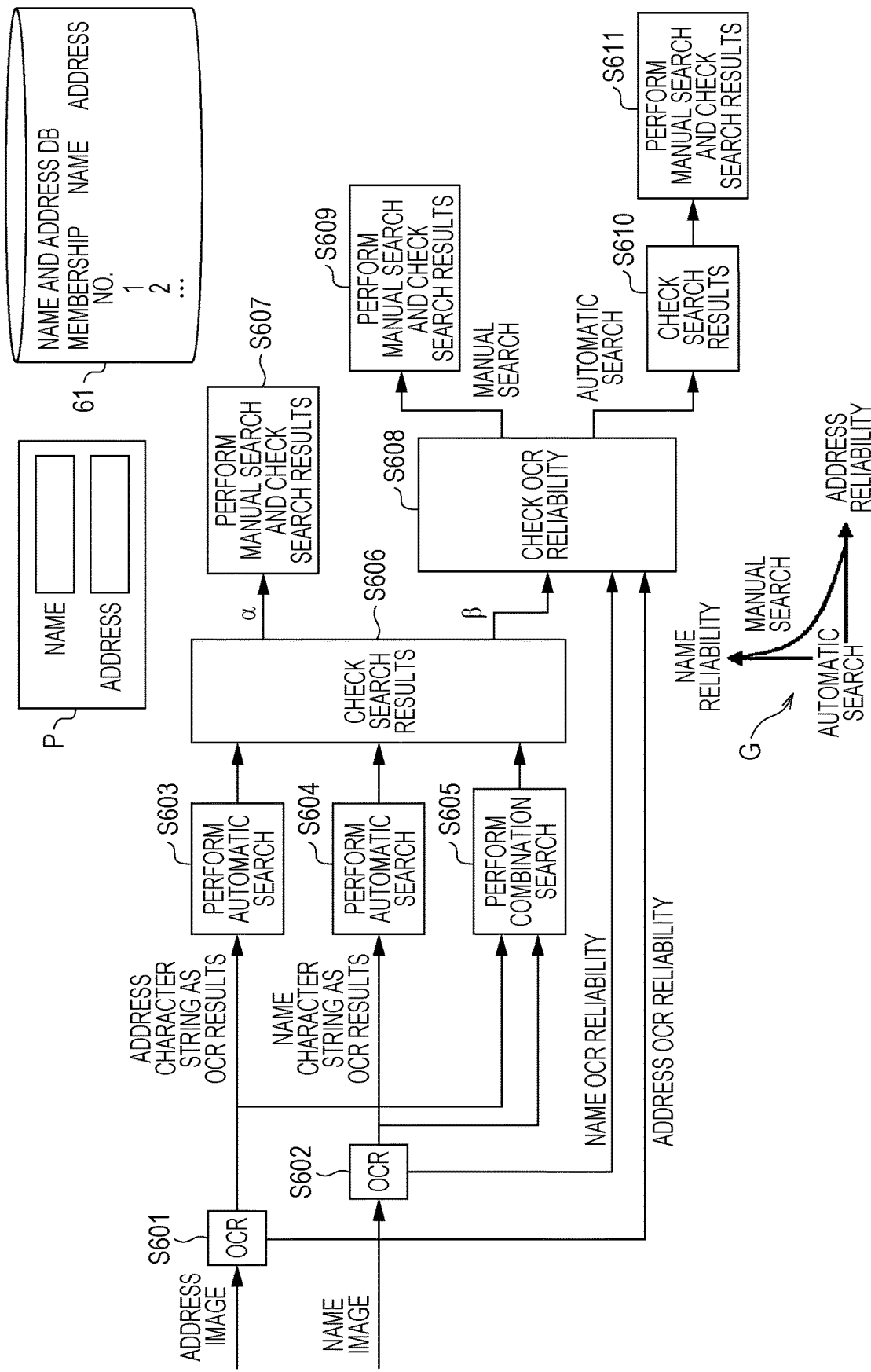
FIG. 9 illustrates a sixth operational procedure.

FIG. 9 illustrates a sixth operational procedure.

In the sixth operational procedure, a combination of plural character strings (two character strings, for example) is used. In the sixth operational procedure, the checking unit 56 checks the search results and the recognized character string. Further in the sixth operational procedure, a name and address written on the paper sheet P are read and recognized by the multi-function apparatus 4. The memory 61 in the server 6 stores the name and address DB that associates names, addresses, and membership numbers.

When the sixth operational procedure starts, the character recognition unit 42 in the multi-function apparatus 4 recognizes the character string of the address and the person's name written in a address column and a name column (steps S601 and S602). The search key acquisition unit 54 acquires the character string of the addresses and names while also acquiring the reliability values of the character recognition of the addresses and names.

The automatic search is performed according to the character strings of the recognized address and name as the search key. In the automatic search of the sixth operational procedure, a membership number is searched for. In this case, the address and name are used in each of an OR gated condition and an AND gated condition. More specifically, the membership number is searched for according to the character string recognized as the address (step S603), the membership number is searched for according to the character string recognized as the name (step S604), and the membership number is searched for according to the search key that results from AND gating the character strings recognized as the address and name (step S605).

The checking unit 56 checks the search results obtained through the search (step S606). In each of steps S603 through S605, the checking unit 56 determines that the search has failed (is in error) if the number of information items is 0 (branch α). If the number of information items is 0 (branch α), processing proceeds to step S607, and the user 2 performs the manual search and the verifies the search results in a way similar to step S104 of FIG. 4.

On the other hand, if information responsive to the search key is found in one of the steps S603 through S605 (branch β), processing proceeds to step S608. The checking unit 56 checks the search key, based on the recognition reliability value of the character string. If information is obtained in response to the AND gated search key in the automatic search (step S605), only the search results responsive to the AND gated search key are used in a process to be performed later even if information is obtained according to the OR gated search key in each of the automatic searches (step S603 or S604).

In a way similar to step S303 of FIG. 6, the checking unit 56 determines in step S608 whether the search key is in error, depending on a combination of the recognition reliability value of the address and the recognition reliability value of the name. A graph G illustrated below step S608 of FIG. 9 is an example of the combination of the reliability values. In the graph G, the abscissa represents reliability values of addresses, and the ordinate represents reliability values of names. The origin at the bottom left corner of the graph G is a point having a maximum reliability value. If the recognition reliability values of addresses and names are lower (in other words, at a point near the top right side of the graph G), the search key is in error. The user 2 proceeds to the manual search. If at least one of the recognition reliability values of the address and the name is higher, the results of the automatic search are used in a process to be performed later.

If the checking unit 56 determines in step S608 that the manual search is to be performed, processing proceeds to step S609. In a way similar to step S104 of FIG. 4, the user 2 performs the manual search and verifies the results of the manual search.

The checking unit 56 determines in step S608 that the results of the automatic search are to be used in a later process, the user 2 verifies the results of the automatic search in a way similar to steps S105 and S106 of FIG. 4 (step S610). If the results of the automatic search are in error, the user 2 performs the manual search and verifies the results of the manual search (step S611).

The variety of operational procedures described above is performed by the search system 3 illustrated in FIG. 2 and FIG. 3. The configuration of the search system 3 configured to perform the operational procedures is not limited to FIG. 2 and FIG. 3. Another configuration example that is configured to be able to perform the operational procedures is described below. In the discussion that follows, elements identical to those of the search system 3 illustrated in FIG. 3 are designated with the same reference numerals and the discussion thereof is omitted herein.

Figure 10:
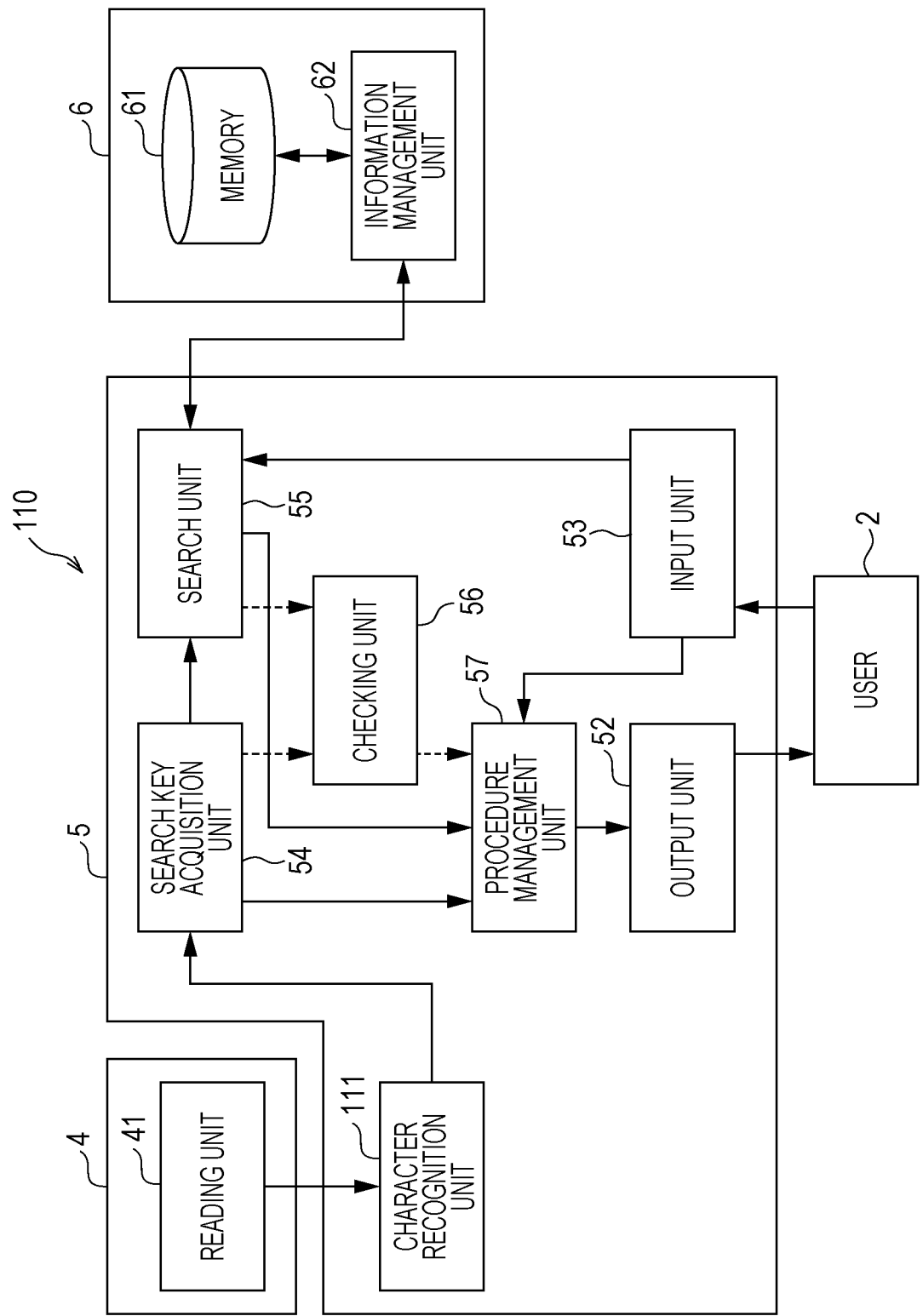
FIG. 10 illustrates a configuration of another search system.

FIG. 10 illustrates a configuration of a search system 110.

The search system 110 includes the multi-function apparatus 4, the personal computer 5, and the server 6. In the configuration of the search system 110, a character recognition unit 111 is included in the personal computer 5.

A text image read by the reading unit 41 in the multi-function apparatus 4 is sent to the personal computer 5. The character recognition unit 111 in the personal computer 5 recognizes characters through character recognition. The search key acquisition unit 54 acquires character string data representing the recognized character string.

In the configuration of the search system 110, the personal computer 5 is the search apparatus in an exemplary embodiment and also serves as a character recognition device.

Figure 11:
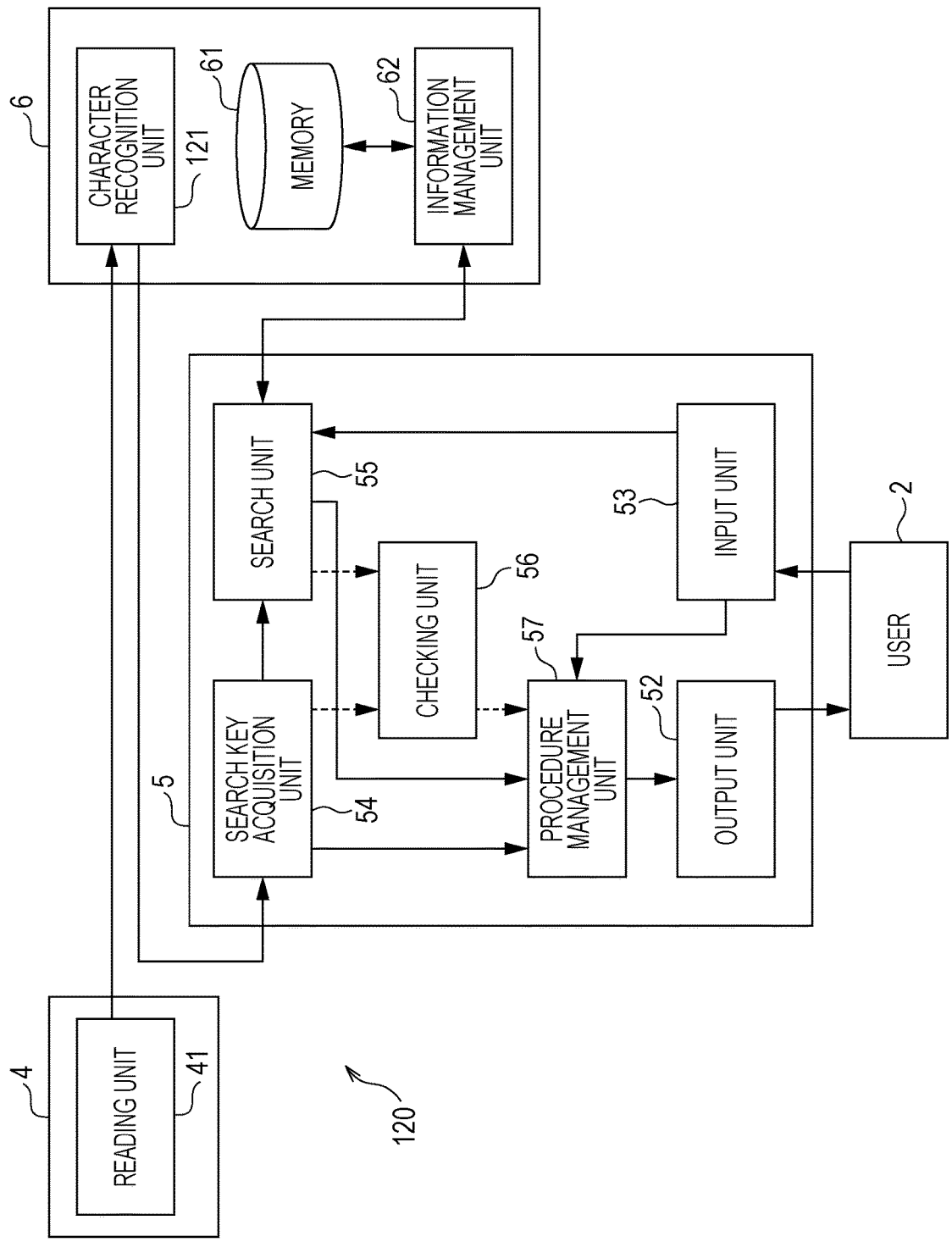
FIG. 11 illustrates a configuration of another search system.

FIG. 11 illustrates a configuration of a search system 120.

The search system 120 also includes the multi-function apparatus 4, the personal computer 5, and the server 6. In the configuration of the search system 120, a character recognition unit 121 is included in the server 6.

A text image read by the reading unit 41 in the multi-function apparatus 4 is sent to the server 6. The character recognition unit 121 in the server 6 recognizes characters through character recognition. The character string data representing the recognized character string is sent from the server 6 to the personal computer 5, and acquired by the search key acquisition unit 54.

In this search system 9, the server 6 has the functionalities for the character recognition and the search. The server 6 performs the process thereof at a higher speed and accuracy with resources thereof.

FIG. 12 illustrates a configuration of a search system 130.

The search system 130 includes the multi-function apparatus 4 and the personal computer 5. In the configuration of the search system 130, a memory 131 and an information management unit 132 are included in the personal computer 5.

In the configuration of the search system 130, the personal computer 5 is the search apparatus in an exemplary embodiment and also serves as an information source.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search apparatus comprising:
at least one processor configured to implement:
a character string acquisition unit that acquires a character string recognized by an optical character recognition device;
a search unit;
a determining unit that determines whether an error factor is present in the recognized character string, wherein the error factor includes at least one of a cause for an erroneous search and an erroneous search result; and
a job switching unit that, in response to the determining unit determining that the error factor is not present in the recognized character string, then, without requesting a manual input job to be performed to input a corrected search key that replaces the recognized character string, instructs the search unit to send, to an information source, the recognized character string as a search key, instructs the search unit to retrieve, out of information stored on the information source, search result information responsive to the search key, and requests a verification job to be performed on the search result information responsive to the search key,
wherein, in response to the determining unit determining that the error factor is present in the recognized character string, then the job switching unit requests the manual input job to be performed to input the corrected search key that replaces the recognized character string, then instructs the search unit to send, to the information source, the corrected search key, instructs the search unit to retrieve, out of the information stored on the information source, search result information responsive to the corrected search key, and requests the verification job to be performed on the search result information responsive to the corrected search key.

2. The search apparatus according to claim 1, wherein the determining unit determines the cause for the erroneous search, using a determination as to whether the recognized character string is in error.

3. The search apparatus according to claim 2, wherein before the search unit sends the recognized character string to the information source, the determining unit determines whether the recognized character string is in error, and
wherein, if the determining unit has determined that the recognized character string is in error, the job switching unit requests the manual input job to be performed to input the corrected search key in place of the recognized character string without sending the recognized character string from the search unit to the information source.

4. The search apparatus according to claim 1, wherein the character string acquisition unit acquires a plurality of character strings that the optical character recognition device has recognized on each of search items,
wherein the search unit sends to the information source a search key that is a combination of the recognized character strings, and
wherein the determining unit determines whether the cause for the erroneous search is present, using a combination of reliability values of the recognized character strings.

5. The search apparatus according to claim 2, wherein the character string acquisition unit acquires a plurality of character strings that the optical character recognition device has recognized on each of search items,
wherein the search unit sends to the information source a search key that is a combination of the recognized character strings, and
wherein the determining unit determines whether the cause for the erroneous search is present, using a combination of reliability values of the recognized character strings.

6. The search apparatus according to claim 1, wherein the determining unit determines whether the erroneous search result is present by verifying the search result information retrieved from the information source.

7. The search apparatus according to claim 2, wherein the determining unit determines whether the error factor is present, using a combination of a verification result of the search result information retrieved from the information source and the determination as to whether the recognized character string is in error.

8. The search apparatus according to claim 3, wherein the determining unit determines whether the error factor is present, using a combination of a verification result of the search result information retrieved from the information source and the determination as to whether the recognized character string is in error.

9. The search apparatus according to claim 4, wherein the determining unit determines whether the error factor is present, using a combination of a verification result of the search result information retrieved from the information source and the determination as to whether the recognized character string is in error.

10. The search apparatus according to claim 5, wherein the determining unit determines whether the error factor is present, using a combination of a verification result of the search result information retrieved from the information source and the determination as to whether the recognized character string is in error.

11. The search apparatus according to claim 6, wherein the determining unit determines whether the error factor is present, using a combination of a verification result of the search result information retrieved from the information source and the determination as to whether the recognized character string is in error.

12. A non-transitory computer readable medium storing a program which, if executed, causes a computer to execute a process for processing information, the process comprising:
acquiring a character string recognized by an optical character recognition device;
determining whether an error factor is present in the recognized character string,
wherein the error factor includes at least one of a cause for an erroneous search and an erroneous search result;
in response to the error factor being determined not to be present in the recognized character string, then, without requesting a manual input job to be performed to input a corrected search key that replaces the recognized character string, sending, to an information source the recognized character string as a search key, retrieving, out of information stored on the information source, search result information responsive to the search key, and requesting a verification job to be performed on the search result information responsive to the search key; and
in response to the error factor being determined to be present in the recognized character string, then requesting the manual input job to be performed to input the corrected search key that replaces the recognized character string, sending, to the information source, the corrected search key, retrieving, out of the information stored on the information source, search result information responsive to the corrected search key, and requesting the verification job to be performed on the search result information responsive to the corrected search key.

13. A search apparatus comprising:
at least one processor configured to implement:
a character string acquisition unit that acquires a character string recognized by an optical character recognition device, the recognized character string being a search key;
a search unit;
a determining unit that determines whether an error factor is present in the recognized character string,
wherein the error factor includes at least one of a cause for an erroneous search and an erroneous search result; and
a job switching unit that, in response to the determining unit determining that the error factor is present, then requests a manual input job to be performed to input a corrected search key that replaces the recognized character string as the search key, and then performs processing comprising:
instructing the search unit to send, to an information source, the search key;
instructing the search unit to retrieve from the information source, search result information responsive to the search key; and
requesting a verification job to be performed on the search result information responsive to the search key,
wherein the job switching unit, in response to the determining unit determining that the error factor is not present, then performs the processing using the search key without requesting the manual input job.

* * * * *